Nov. 30, 1948.  H. W. SCHNEIDER  2,455,024
DRILL JIG
Filed Sept. 9, 1946
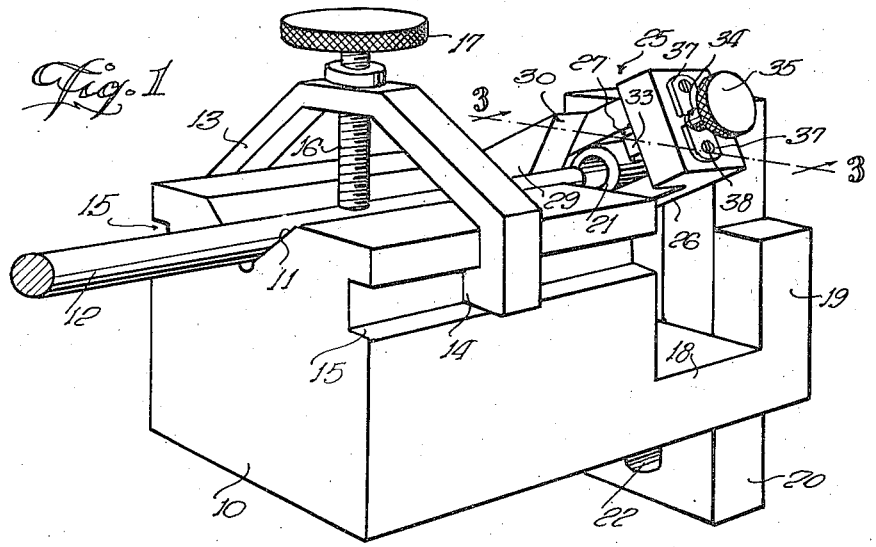
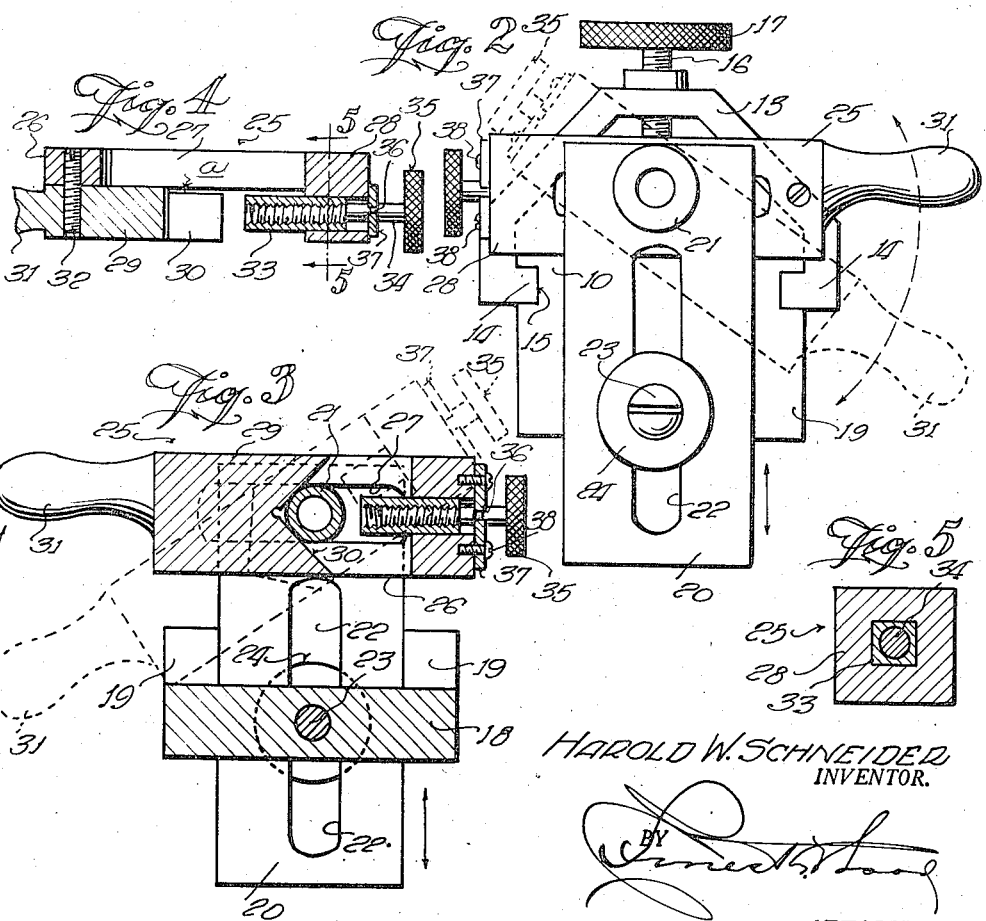
HAROLD W. SCHNEIDER
INVENTOR.
BY
ATTORNEY Patented Nov. 30, 1948

2,455,024

UNITED STATES PATENT OFFICE 2,455,024

DRILL JIG

Harold W. Schneider, Terrell, Tex.

Application September 9, 1946, Serial No. 695,716

5 Claims. (Cl. 77—62)

1

This invention relates to drill jigs and more particularly to a tool for center drilling, tap drilling and drilling holes in stock of various cross-sectional shape.

The principal object of the invention is to provide a drill jig as a lathe attachment, to find use in shops which are not equipped with the more expensive centering machine. The invention affords a stock centering device of simple and economical construction yet having the quality to accurately center a drill in relation to the workpiece by the simple, manual manipulation of a single centering lever oscillatably disposed in relation to the workpiece, in order that a V-slot carried thereby will constrain the lever to move to a predetermined position in relation to the workpiece when actuated and in so doing, a vertically slidable bushing plate will be moved under frictional rsertaint so that its bushing will be accurately aligned with the end of the workpiece clamped in the drill jig.

Another object of the invention is to provide a drill jig for centering or locating the center of a workpiece clamped in a seat, the latter having therein a ninety degree V in which the workpiece is clamped, said seat at its forward end a vertically slidable bushing plate, the latter having an interchangeable bushing therein whose center is adapted to be vertically moved across the center of the workpiece. An oscillatable centering lever is provided having a V opening or recess adapted to engage the workpiece is further provided with a longitudinal slot embracing the bushing of the bushing plate and whose manipulation results in the bringing into register the drill bushing of the plate with the workpiece in the clamp.

Still another object of the invention is to provide a drill jig having a longitudinally grooved body provided with a vertically displaceable bushing plate carrying a bushing and a centering lever in which the latter is provided with a centering screw to insure precision alignment of the bushing of the plate with the workpiece preparatory to drilling through the bushing.

With the foregoing and other objects in view, the invention has further reference to certain features of accomplishment which will become apparent as the description proceeds taken in connection with the accompanying drawings wherein:

Figure 1 is a rear perspective view of a drill jig constructed according to the present invention.

Figure 2 is a front elevational view thereof.

Figure 3 is a view taken generally on line 3—3 on Figure 1.

2

Figure 4 is a detail plan view of the centering lever shown in longitudinal cross-section, and Figure 5 is a view of the centering lever taken on 5—5 on Figure 4.

Continuing with a more detailed description of the drawing, reference is primarily made to Figure 1 wherein numeral 10 denotes a block or body having a longitudinal, ninety degree V groove in its top which is indicated by reference numeral 11 and which serves as a seat for the workpiece 12. A work clamping member is provided which consists of a yoke 13 whose inwardly directed legs 14 slidably enter the slot 15 in each side of the block or body 10. A set screw 16 enters the top of the yoke 13 and carries a knurled knob 17 by which the screw 16 is advanced upon and retracted from the workpiece 12.

Formed integrally with the forward end of the body 10 is a projection 18 having vertically disposed guide members 19 formed thereon between which is slidably disposed a bushing plate 20 which is held against other than vertical sliding displacement by the guide members 19. The bushing plate 20, so called, because of the bushing 21 in its upward end, is provided with a longitudinal slot 22 through which extends a set screw 23, the latter being threaded into the front portion of the projection 18 of the body 10. A washer 24 surrounds the set screw 23 and bears against the outer face of the bushing plate 20 so that frictional engagement between the washer 24 and the plate 20 will be sufficient to hold the plate in adjusted position.

The bushing 21 is press fitted into an aperture in the upper end of the bushing plate 20 and it will be understood that the bushing 21 is interchangeable with others whose bore diameters are such as to accommodate drills of different sizes. Moreover, interchangeability of the bushing 21 will provide for renewal of worn bushings.

It being the purpose of the described arrangement to move the bushing plate 20 so that the bore in the bushing 21 carried by the plate will be brought into register with the workpiece 12, a centering lever 25 is provided and is shown in detail in Figures 3 and 4. This centering lever 25 is preferably constructed in two parts, the part 26 being provided with a longitudinal slot 27 and terminating at one end in a head 28 to which further reference will be made presently. Companion to the part 26 is a part 29 which is parallel to the part 26 of the centering lever but terminates at the approximate center of the part 26 and in the end thereof is provided a 90° included angle recess 30. On the opposite end of the part 29 is an operating handle 31. The center line of the 90° recess 30 and the center line of the longitudnal slot 27 are concentric. The two parts 26 and 29 are suitably held together by means of a screw 32 or by welding or otherwise. For all practical purposes, the centering lever 25 is in a single piece but the illustrated construction is considered appropriate for economical manufacture. It is obvious however that this element can be cast.

Being that the slot 27 will at all times embrace the bushing 21, it will be understood that the center line of slot 27, will at all times cross the center line of the bushing 21, regardless of position of either bushing plate or centering lever 25. The center line of bushing 21, in bushing plate 20, is always in alignment with the center line of the ninety degree included angle 11 in the main body of the jig. Therefore, the engagement of the recess 30 with the workpiece 12 automatically raises or lowers the bushing 21, to an alignment with the workpiece 12.

In operation, the workpiece 12 is first clamped in the recess 11 of the body 10 and is so placed that the end of the workpiece will rest a little past the recess 30 of the centering lever 25 with the end of the workpiece extending past recess 30 into a slot *a* (Figure 4) which provides for burs and uneven places directly on the end of the stock or workpiece 12. The bushing plate 20 is then adjusted by means of the screw 23 so that there will be a slight tension on the bushing plate when the latter is moved up and down by hand. The centering lever 25 is then pushed by hand in a horizontal line with the body of the jig so that the V-shaped recess 30 will fit firmly against the workpiece 12 whereupon the centering lever is rocked over and under the horizontal axis to raise or lower the bushing plate 20 as the case may be to align the center of its bushing 21 with the center of the workpiece 12. By rocking or oscillating the centering lever 25 over and under the horizontal axis of the jig and at the same time exterting pressure by hand, the slight area of the eye is overcome as the centering lever is actuated through the horizontal plane. The slot 27 in the centering lever 25 is in alignment with the ninety degree included angle of the recess 30. The slot is a slide fit on the outside diameter of the bushing which extends through the bushing plate 20 when the V-shaped recess 30 of the centering lever 25 is urged against the workpiece 12, the slot 27 of the centering lever which embraces the bushing 21, automatically aligns the drill bushing with the center of the stock. Now that the bushing 21 is in line with the stock, the screw 23 on the bushing plate is tightened to hold the bushing plate against displacement. A hand electric drill is now inserted through the bore of the bushing 21 and a hole of the desired size may be drilled in the center of the workpiece 12.

While it is not an essential element of the invention, provision is made through the medium of a screw actuated plunger 33 (Figures 4 and 5) to positively urge the centering lever 25 against the workpiece as a precaution against carelessness in operating the centering lever. The plunger 33 consists of a square bushing which is slidably disposed in a square opening in the head 28 of the part 26 of the centering lever 25. The plunger 33 is longitudinally tapped and threaded to receive a screw 34 having a knurled head 35 thereon. The screw 34 is held against other than rotation by means of an annular groove 36 adjacent the head 35 in which lie the confronting ends of plates 37 which plates are fixed to the head 28 of the centering lever 25 by means of screws 38. It is apparent therefore that by rotating the head 35 of the screw 34, the plunger 33 is advanced towards and away from the center of the centering lever 25 and in cases where the bushing 21 is faultally centered in relation to the workpiece 12, the plunger 33 may be advanced against the work, causing the centering lever 25 to so move that its V recess 30 will advance against the work, bringing the drill bushing 21 into positively centered relationship to the workpiece 12.

The centering drill jig described in the foregoing may also be used for center drilling in a lathe by turning the lathe slowly until the end of the drill has been well started and then the jig may be removed and the stock then drilled to a depth in the conventional manner.

Manifestly, the construction as shown and described is capable of some modification and such modification as may be construed to fall within the scope and meaning of the appended claims is also considered to be within the spirit and intent of the invention.

What is claimed is:

1. A centering drill jig including a body having a bifurcated end and a work receiving recess, clamping means for holding a workpiece in predetermined relation to the bifurcated end of said body, a bushing plate disposed for vertical sliding displacement between the bifurcations in the ends of said body and guided thereby, an interchangeable bushing carried by one end of said plate, an elongated and oscillatable centering lever having a longitudinal slot to receive the inner end of said bushing, said centering lever having a recess intermediate its ends provided with a V-shaped end confronting a workpiece in said jig body and adapted to engage said workpiece when said lever is oscillated and laterally moved, to effect vertical movement of said bushing plate and alignment of said bushing with the center of said workpiece.

2. A centering drill jig including a body having a work receiving groove in the top thereof and provided at its forward end with spaced guide members, means for clamping a workpiece in the groove of said body, a bushing plate slotted for vertical movement between the guide members on said body, an interchangeable drill bushing in the upper end of said plate, an elongated and oscillatable centering lever having longitudinal slot therein embracing a portion of said bushing, a protuberance carried by and parallel with said centering lever having a V-shaped recess at one end adapted to be advanced upon a workpiece clamped in said jig upon oscillative and lateral displacement of said lever to constrain said bushing plate to move through the cooperative relationship of said lever and bushing, to cause the latter to move into alignment with said workpiece.

3. A centering drill jig including a body having a work receiving groove in the top thereof and a clamp for retaining a workpiece in said groove, a plate constrained to move perpendicularly to said workpiece, an interchangeable drill bushing carried by said plate, an oscillatable and laterally displaceable lever having an elongated slot therein embracing a portion of said bushing and having a V-shaped portion adapted to be advanced upon the work when said lever is swung and laterally moved on said bushing, to move the latter into concentric relationship with said work.

4. A work centering device including a horizontal body having a work receiving groove and a work retaining clamp, a plate retained by and movable perpendicularly on one end of said body, an interchangeable bushing extending through said plate, an oscillatable and laterally movable centering lever slotted to receive a portion of said bushing and having a V-shaped recess adapted to be advanced upon a workpiece in said body when said lever is swung oscillatably and moved laterally on said bushing to move said plate vertically and effect concentric relationship of the bushing carried thereby with the workpiece and means for securing said plate against displacement.

5. A centering tool comprising a work holding body having a bushing plate slidable vertically on one end thereof and carrying a horizontally disposed and interchangeable drill bushing, a lever having an angularly recessed V-shaped portion adapted to be advanced against the end of a workpiece on said body and slotted longitudinally to receive a portion of said bushing said lever being adapted for oscillative and lateral displacement on said bushing to constrain said plate and bushing to move to a centered position predetermined by engagement of said V-shaped portion of said lever with a workpiece clamped on said body.

HAROLD W. SCHNEIDER.

REFERENCES CITED

The following references are of record in the file of this patent:

UNITED STATES PATENTS

| Number | Name | Date |
|--------|------|------|
| 2,242,792 | Panzer | May 20, 1941 |